United States Patent
Veka

(10) Patent No.: US 12,042,913 B2
(45) Date of Patent: Jul. 23, 2024

(54) CONNECTION MEMBER AND A METHOD OF CONFIGURING SAID MEMBER

(71) Applicant: Van Beest Group B.V., Sliedrecht (NL)

(72) Inventor: Kjell Magne Veka, Fana (NO)

(73) Assignee: VAN BEEST GROUP B.V., Sliedrecht (NL)

( * ) Notice: Subject to any disclaimer, the term of this patent is extended or adjusted under 35 U.S.C. 154(b) by 839 days.

(21) Appl. No.: 17/037,214

(22) Filed: Sep. 29, 2020

(65) Prior Publication Data
US 2021/0094159 A1 Apr. 1, 2021

(30) Foreign Application Priority Data
Oct. 1, 2019 (NO) .................................... 20191175

(51) Int. Cl.
*B25B 27/22* (2006.01)
(52) U.S. Cl.
CPC .................................... *B25B 27/22* (2013.01)
(58) Field of Classification Search
CPC ....... B25B 27/22; B63B 21/20; F16G 11/146; F16G 11/14; B66C 1/125
See application file for complete search history.

(56) References Cited

U.S. PATENT DOCUMENTS 4,779,411 A 10/1988 Kendall
9,920,870 B2 * 3/2018 Bond, Jr. .............. F16L 55/005
10,145,448 B2 * 12/2018 Laurant ..................... F16B 2/26
11,512,806 B1 * 11/2022 Bond, Jr. ................ F16L 57/02
2004/0194259 A1 * 10/2004 Tylaska ................ F16G 11/046
24/115 R (Continued)

FOREIGN PATENT DOCUMENTS

DE 29608144 U1 7/1996
EP 2122194 A1 3/2016

(Continued)

OTHER PUBLICATIONS

NO 20191175; Norwegian Search Report and Office Action; dated May 1, 2020; 5 pages.

(Continued)

*Primary Examiner* — David M Upchurch
(74) *Attorney, Agent, or Firm* — KILPATRICK TOWNSEND & STOCKTON LLP

(57) ABSTRACT

A method of configuring a connection member. The connection member comprises a first end, a second end, and an intermediate portion between said ends. Each end comprises respective first and second insertion regions. In the operative state, first and second curved sections are arranged on opposite sides of each of the first and second ends. The first and second ends are movable to be arranged in the vicinity of each other, and abut against each other, and thereby form a lock over the intermediate portion. The connection member may be a loop formed of a flexible material or a flexible elongated body having a first end and a second end, separated by an intermediate portion and comprising at each end respective first and second insertion regions. The connection member may be formed from a rope having first and second ends formed by braiding or other technique.

7 Claims, 5 Drawing Sheets

(56) References Cited

U.S. PATENT DOCUMENTS

| | | | |
|---|---|---|---|
| 2008/0184532 A1* | 8/2008 | Dugger | F16G 11/046 |
| | | | 24/1 |
| 2010/0077718 A1* | 4/2010 | Wienke | D07B 5/005 |
| | | | 140/108 |
| 2011/0247183 A1 | 10/2011 | Tylaska et al. | |
| 2013/0185900 A1* | 7/2013 | Campbell | F16G 11/14 |
| | | | 24/301 |
| 2014/0217761 A1* | 8/2014 | Bond, Jr. | F16L 55/005 |
| | | | 294/74 |
| 2014/0310920 A1* | 10/2014 | Jarvis | F16G 11/10 |
| | | | 289/1.5 |

FOREIGN PATENT DOCUMENTS

| | | |
|---|---|---|
| FR | 2821908 | 9/2002 |
| WO | 2008/089798 A1 | 7/2008 |
| WO | 2009/115249 A1 | 9/2009 |
| WO | 2015/072906 A1 | 5/2015 |
| WO | 2015/086627 A2 | 6/2015 |
| WO | 2016/073974 A1 | 5/2016 |

OTHER PUBLICATIONS

Application No. EP20198896.1, Extended European Search Report, dated Feb. 16, 2021, 7 pages.

* cited by examiner (a)            (b)

(c)            (d)

(e)            (f)

CONNECTION MEMBER AND A METHOD OF CONFIGURING SAID MEMBER

CROSS-REFERENCES TO RELATED APPLICATIONS

The present application claims priority to Norwegian Patent Application No. 20191175, filed Oct. 1, 2019, which is hereby incorporated by reference in its entirety for all purposes.

TECHNICAL FIELD

The invention concerns a device for connecting objects, such as but not limited to, lifting, rigging, hauling, securing and mooring components. More specifically, the invention concerns a connection member comprising a flexible body, and a method of configuring the connection member, as set out by the preamble of claim 1.

BACKGROUND

Chains made up of non-metallic loops are well known and increasingly used for lifting, suspending, hoisting and securing cargo, as well as for mooring purposes at sea.

The prior art includes U.S. Pat. No. 4,779,411, which describes a non-metallic rigging chain formed with a plurality of linked flexible loops. Each loop has a core which consists of a continuous strand of non-metallic material coiled upon itself. The coiled core material is enclosed in a sheath of a woven outer fabric.

The prior art also includes WO 2008/089798, which describes a chain suitable to moor or anchor boats, to lash cargo in road, rail, water and air transportation or for conveying, hoisting, suspending or lifting applications. The chain comprises a plurality of interconnected links, and at least part of the links comprise polyolefin multifilament yarns. In particular, the yarns comprise ultrahigh molecular weight polyethylene (UHMWPE) fibres.

The prior art also includes WO 2009/115249 and WO 2015/086627, which describe a chain having a plurality of chain links comprising a polymeric fibre.

Chains (metallic and non-metallic), cordages (metallic and non-metallic), webbing, etc., are normally interconnected or connected to other objects by means of conventional, metallic, shackles or connecting links. One example of such shackle is disclosed by US 2011/0247183 A1, which describes a plunger pin shackle locking apparatus that prevents accidental release of the snap shackle. Another example is disclosed by WO 2015/072906 A1, which describes a shackle having a first end with a first hole and a second end with a second hole, and the holes are aligned with a common centre line. A shackle bolt is movable along the common centre line between a closed position and an open position. The shackle comprises a first and a second locking device and a handle.

However, conventional shackles are sometimes replaced by so-called "soft shackles", particularly in the sailing industry. The prior art includes WO 2016/073974 A1, which describes how a common soft shackle is made with a single length of line noosed at one end where the lines running through each other, and knotted together at the other end. In use, the knot is inserted through the noose, and the noose tightened to form a securing loop. One variant of the soft shackle is to use a button in lieu of the knot, where the button shackle generally comprises a single length of braided rope noosed at one end by looping one end of the rope and running it back through itself, such that the end passes through the braids, to form a noose. The two ends of the rope are then woven together to form an eye, and a two-piece button is inserted onto the eye. The two-piece button includes an inner disk formed with opposing yokes for receiving the rope, and an outer collar for holding the rope captive once inserted into the yokes.

The present invention provides certain improvements over the known soft shackles, and introduces further advantages.

SUMMARY

The invention is set forth and characterized in the main claim, while the dependent claims describe other characteristics of the invention.

It is thus provided a method of configuring a flexible connection member, said connection member comprising a first end, a second end, and an intermediate portion between said ends; and each end comprising respective first and second insertion regions; the method comprising the steps of:
  i) introducing the first end a distance through the second insertion region, such that the second end is arranged around the intermediate portion;
  ii) arranging the first insertion region over a second curved section of the intermediate portion, such that the second curved section protrudes through the first insertion region and a first curved section of the intermediate portion is formed on the opposite side of the first insertion region;
  whereby the second and first curved sections are arranged on opposite sides of the first end and on opposite sides of the second end,
  wherein the first and second ends are moved to be arranged in the vicinity of each other, and abut against each other, and thereby form a lock over the intermediate portion.

In one embodiment of the method, step i) is preceded by inserting the first end through a first object and inserting the second end through a first portion of a second object, and step ii) is preceded by moving the first insertion region over a second portion of the second object.

The second object may be an elongated element, such as a chain or cordage, and the first portion may be a first link and the second portion may be a last link, an end-termination or the end of a cordage.

It is also provided a flexible connection member configured in accordance with the method of the invention, wherein the connection member comprises a loop formed of a flexible material, such as an endless band or rope.

It is also provided a flexible connection member configured in accordance with the method of the invention, wherein the connection member comprises a flexible elongated body having a first end and a second end, separated by an intermediate portion and comprising at each end respective first and second insertion regions. The flexible connection member may be formed from a rope having first and second ends formed by braiding or any other known and applicable technique. The connection member may also be formed from the connection member of the first embodiment, in which the intermediate portion is formed by arranging a sleeve, winding/braiding a string around, or by any other means merging together a portion of the endless band or rope, so it is fixed in/as one unitary and elongated member.

The invented connection member is a useful component in mooring or anchoring boats and other floating vessels, in lashing cargo for road, rail, water and air transportation or in conveying, hoisting, suspending or lifting applications.

BRIEF DESCRIPTION OF THE DRAWINGS

These and other characteristics of the invention will become clear from the following description of embodiments of the invention, given as non-restrictive examples, with reference to the attached drawings, wherein.

DETAILED DESCRIPTION

Figure 1:
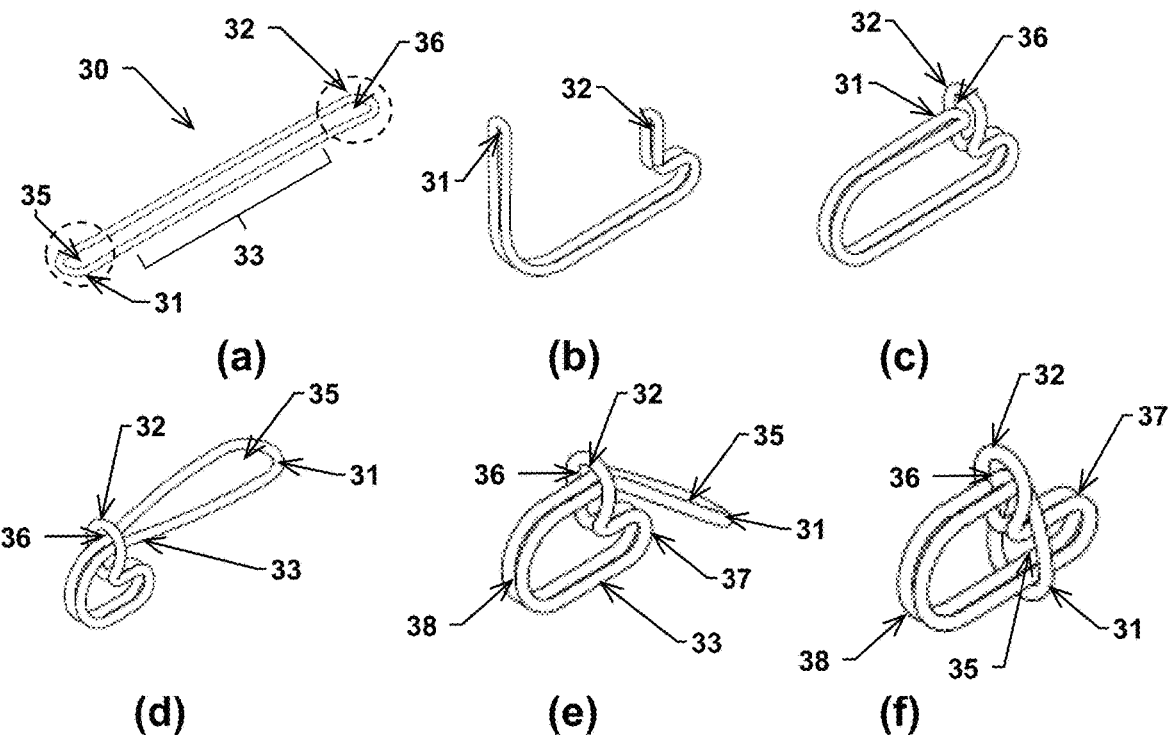
FIG. 1 is a perspective drawing of a first embodiment of the invention, and illustrates a series of steps to form an operative connection member.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Referring initially to FIG. 1, the connection member 30 comprises in a first embodiment a loop formed of a flexible material. Although an inelastic flexible material is envisaged for most applications, an elastic material is also conceivable. The flexible material may be a fibre material, such as polymeric fibres, synthetic plastic material, such as polyester, nylon or Kevlar. The flexible materiel may be an ultra-high-molecular weight polyethylene. The connection member may be formed by extrusion, pultrusion, braiding, winding or any other method for forming a flexible body. The connection member may have a circular or non-circular cross-section. The connection member may be a band or a braided rope, comprising e.g. DYNEEMA® or SPECTRA®.

In the embodiment illustrated in FIG. 1, the connection member 30 is an endless band or rope which, when arranged as shown in step a, has a first end 31, a second end 32, and an intermediate portion 33. At each end 31, 32 are respective first and second openings 35, 36; indicated by dotted circles and in the following also referred to as first and second insertion regions 35, 36.

In step b of FIG. 1, the connection member 30 is bent, for example by human hands or other implement (not shown), such that the first and second ends 31, 32 are moved towards each other.

In the subsequent step c, the first end 31 is about to be inserted into the second insertion region 36.

In step d, the first end 31 has been introduced a distance through the second insertion region 36, such that the second end 32 (and second insertion region 36) is arranged around the intermediate portion 33.

In step e, the intermediate portion 33 has been moved even further through the second insertion region 36, and the first end 31 is bent towards a curved section 37 (hereinafter referred to as the second curved section) of the intermediate portion 33.

In step f, the first insertion region 35 has been moved over the second curved section 37, such that the second curved section 37 protrudes through the first insertion region 35. Another curved section 38 (hereinafter referred to as the first curved section) of the intermediate portion 33 is formed on the opposite side of the first insertion region 35.

Thus, when the connection member 30 is arranged in its completed and operative state as shown in step f of FIG. 1, the second and first curved sections 38, 37 are arranged on opposite sides of the first end 31, and on opposite sides of the second end 32. The first and second ends 31, 32 are arranged in the vicinity of each other. The first and second ends 31, 32 may abut against each other when loads are applied to the first and second curved sections 38, 37, and thereby form a lock over the intermediate portion.

Figure 2:
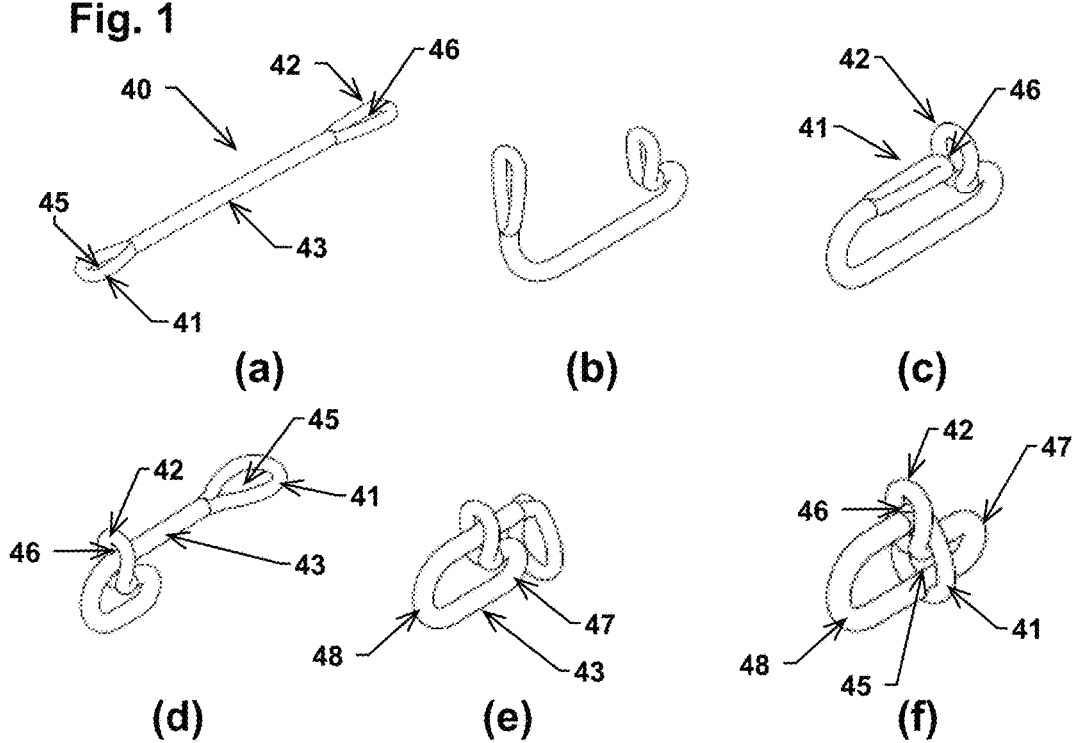
FIG. 2 is a perspective drawing of a second embodiment of the invention, and illustrates a series of steps to form an operative connection member.

FIG. 2 illustrates a second embodiment of the invented connection member. Here, the flexible connection member 40 comprises an elongated body having a first end 41 and a second end 42, separated by an intermediate portion 43. At each end 41, 42 are respective first and second openings 45, 46; in the following also referred to as first and second insertion regions 45, 46. The connection member 40 may be formed from a rope in which the first and second ends 41, 42 are formed by braiding or any other known and applicable technique. The connection member 40 may also be formed from the connection member 30 of the first embodiment, in which the intermediate portion 43 is formed by arranging a sleeve, winding and/or braiding a string around, or by any other means of merging together a portion of the endless band or rope such that it comprises one unitary and elongated member. The materials and their properties may be similar to those mentioned above with reference to the first embodiment. The steps to form the connection member 40 of the second embodiment correspond to the steps described above with reference to the first embodiment:

In step b of FIG. 2, the connection member 40 is bent, for example by human hands or other implement (not shown), such that the first and second ends 41, 42 are moved towards each other.

In the subsequent step c, the first end 41 is about to be inserted into the second insertion region 46.

In step d, the first end 41 has been introduced a distance through the second insertion region 46, such that the second end 42 (and second insertion region 46) is arranged around the intermediate portion 43.

In step e, the intermediate portion 43 has been moved even further through the second insertion region 46, and the first end 41 is bent towards a curved section (the second curved section) 47 of the intermediate portion 33.

In step f, the first insertion region 45 has been moved over the second curved section 47, such that the second curved section 47 protrudes through the first insertion region 45. Another curved section (the first curved section) 48 of the intermediate portion 43 is formed on the opposite side of the first insertion region 45.

Thus, when the connection member 40 is arranged in its completed and operative state as shown in step f of FIG. 2, the second and first curved sections 48, 47 are arranged on opposite sides of the first end 41, and on opposite sides of the second end 42. The first and second ends 41, 42 are arranged in the vicinity of each other. The first and second ends 41, 42 may abut against each other when loads are applied to the first and second curved sections 48, 47, and thereby form a lock over the intermediate portion.

Figure 3:
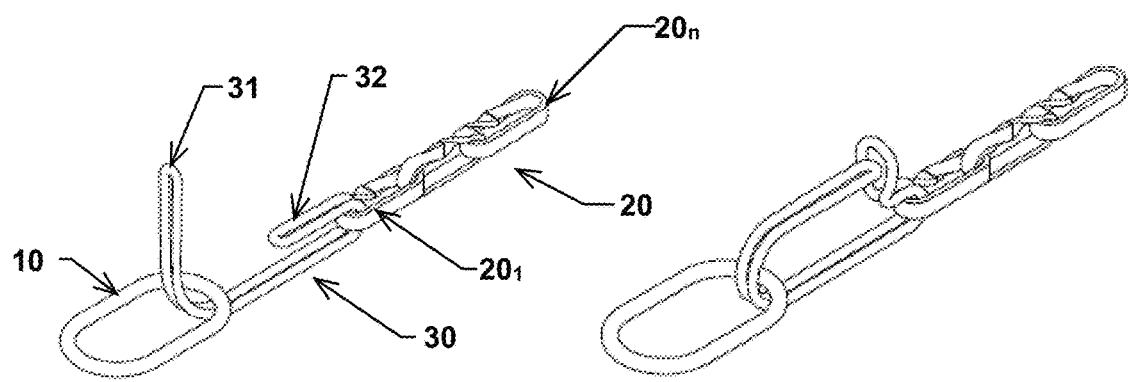
FIG. 3 is a perspective drawing of the first embodiment of the invention, and illustrates a series of steps to form an operative connection member to connect a chain and a ring (master link)
Figure 3:
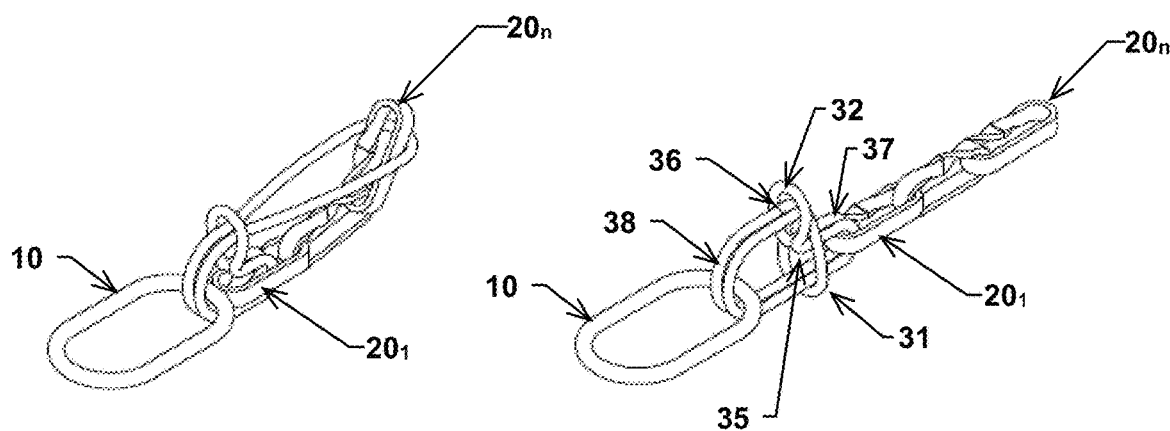

FIG. 3 illustrates a method of forming an operative connection member 30 corresponding to the method described above with reference to FIG. 1, but illustrates in addition how the connection member 30 interconnects two objects. In FIG. 3, these objects are a ring 10, as so-called master link (a first object) and a chain 20 (a second object) having n links. In FIG. 3, the chain comprises three links, but the chain may have any number of links. The chain may be made of any material (metallic or non-metallic). Although the figure illustrates a chain, it should be understood that the second object may be a wire, cordage, or any other elongated object or combinations of such objects having at least an opening into which an end of the connection member may be introduced.

In step a of FIG. 3, the first end 31 has been inserted through the first object (the master link) 10 and the second end 32 has been inserted through a portion of the second object (a first link 201 of the chain 20). In step c, the first insertion region 35 has been moved over the last link 20n of the chain, and then (in step d) pulled back such that the second curved section 37 (which extends through the first link 201) protrudes through the first insertion region 35. A first curved section 38 (which extends through the ring 10) of the intermediate portion 33 is formed on the opposite side of the first insertion region 35.

Thus, when the connection member 30 is arranged in its completed and operative state as shown in step d of FIG. 3, the second and first curved sections 37, 38 are arranged on opposite sides of the first end 31, and on opposite sides of the second end 32. The first and second ends 31, 32 are arranged in the vicinity of each other. The first and second ends 31, 32 may abut against each other when loads are applied to the first and second curved sections 38, 37, e.g. via the master link and/or chain. The first and second ends 31, 32 thereby form a lock over the intermediate portion.

Figure 4:
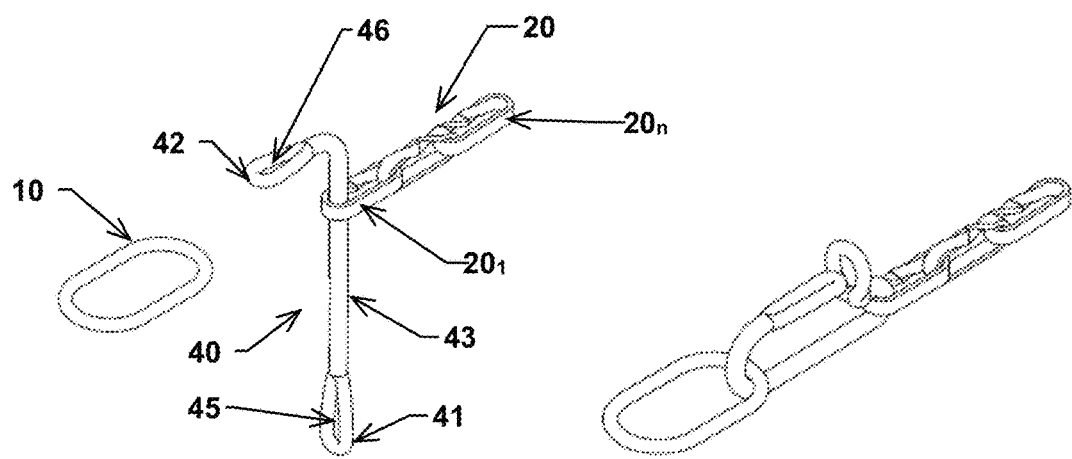
FIG. 4 is a perspective drawing of the second embodiment of the invention, and illustrates a series of steps to form an operative connection member to connect a chain and a ring (master link)
Figure 4:
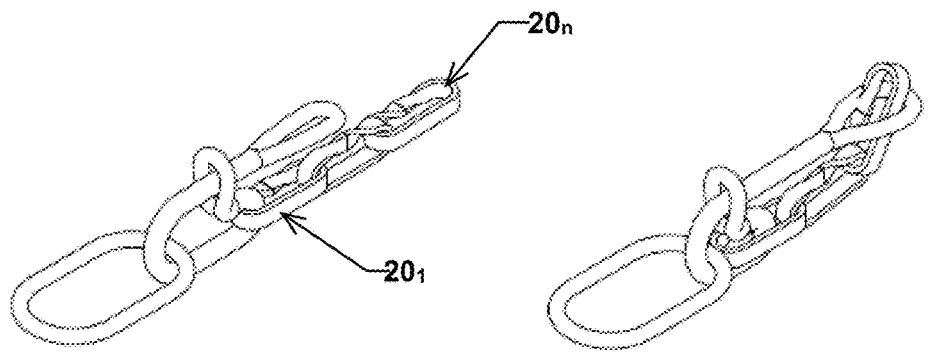
Figure 4:
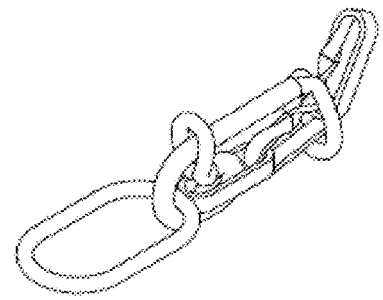
Figure 4:
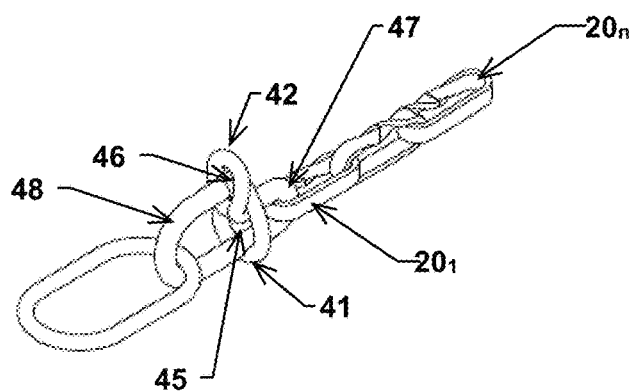

FIG. 4 illustrates a method of forming an operative connection member 40 corresponding to the method described above with reference to FIG. 2, but illustrates in addition how the connection member 30 interconnects two objects. These objects are similar to the objects described above with reference to FIG. 3, and the method of FIG. 4 corresponds to the method of FIG. 3, described above.

Figure 5:
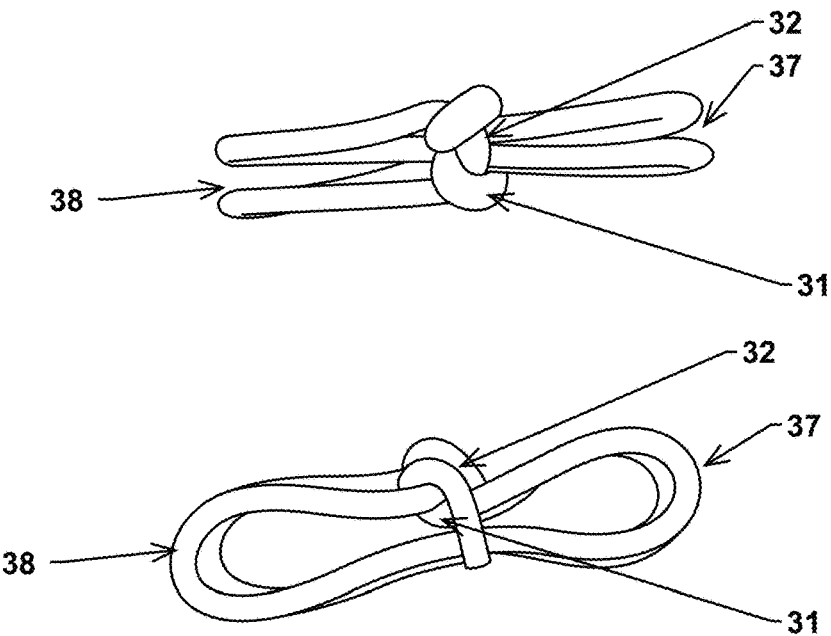
FIGS. 5, 6, 7 depict, in side view and top view, alternative embodiments of the invented connection member.
Figure 6:
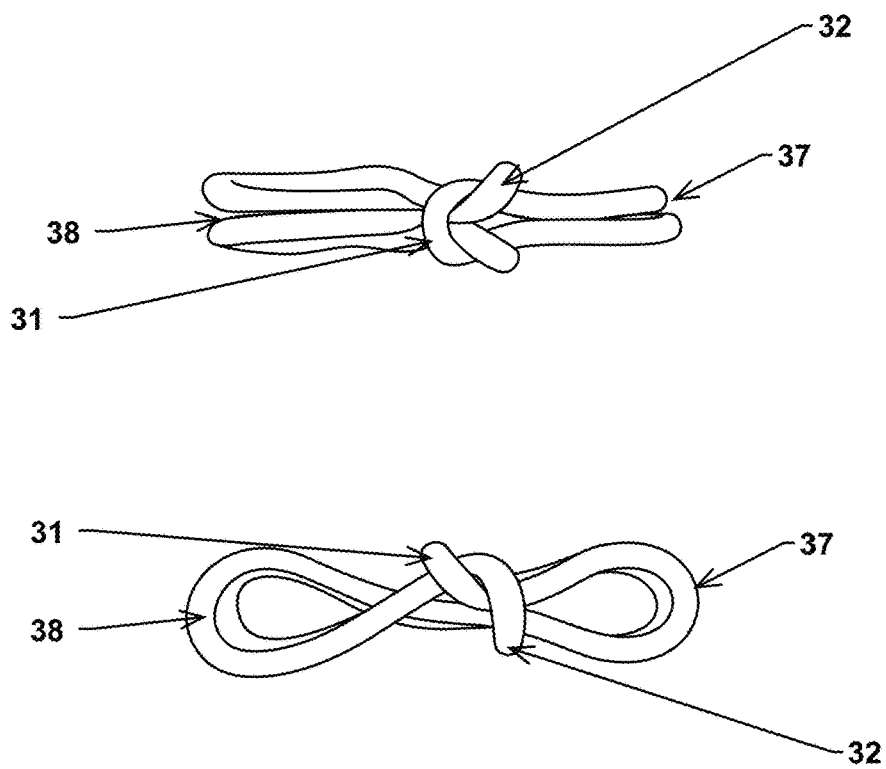
Figure 7:
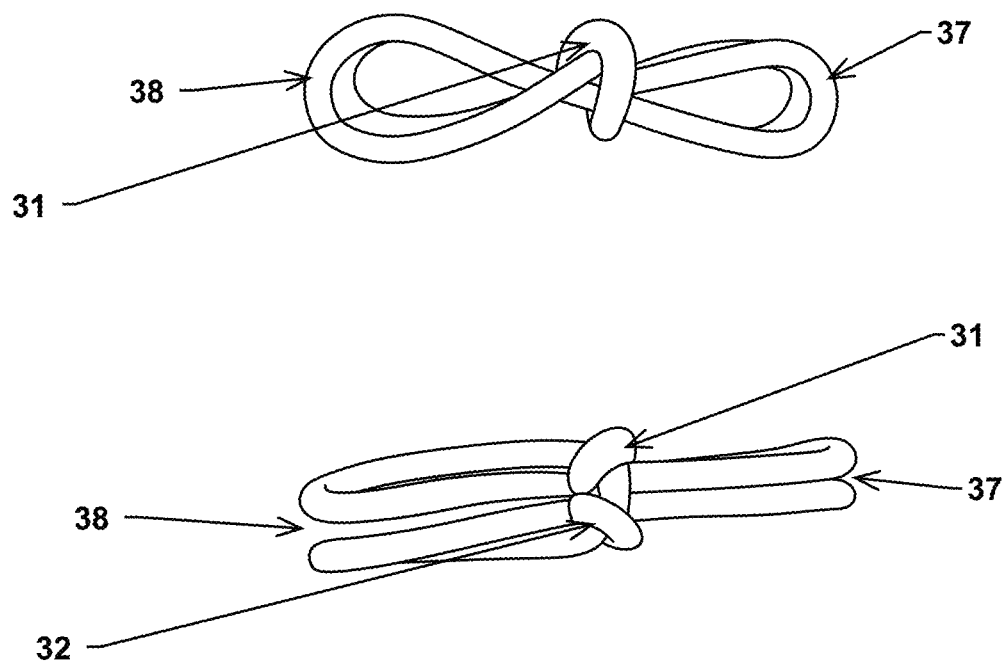

FIGS. 5, 6 and 7 illustrate alternative embodiments of the invented connection member, all sharing the common feature that the first and second curved sections 38, 37 are arranged on opposite sides of the first end 31, and on opposite sides of the second end 32. The first and second ends 31, 32 are arranged in the vicinity of each other. The first and second ends 31, 32 abut against each other, thereby forming a lock over the intermediate portion.

Although the invented connection member has been described as a soft shackle or connecting link, it should be understood that it may have applications other than that of a shackle or connecting link. For example, multiple connection members may be interconnected in series, either by themselves or in combinations with endless loops, to form a soft chain. Although the invented connection member has been described and illustrated in conjunction with a chain comprising flexible link members, it should be understood that the invention is equally applicable for connection to a metal chain, or to any other object.

Although the invention has been illustrated by a series of consecutive steps, the invention shall not be restricted to these discrete steps.

In the embodiments described above, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As a person skilled in the art readily will understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

What is claimed is:

1. A method of configuring a flexible connection member, the flexible connection member comprising a first end, a second end, and an intermediate portion between the first end and the second end, the first end comprising a first insertion region and the second end comprising a second insertion region; the method comprising the steps of:
   i) introducing the first end a distance through the second insertion region, such that the second end is arranged around the intermediate portion; and
   ii) arranging the first insertion region over a second curved section of the intermediate portion, such that the second curved section protrudes through the first insertion region and a first curved section of the intermediate portion is formed on an opposite side of the first insertion region;
   whereby the second and first curved sections are arranged on opposite sides of the first end and on opposite sides of the second end,
   wherein the first and second ends are moved to be arranged in the vicinity of each other, and abut against each other, and thereby form a lock over the intermediate portion.

2. The method of claim 1, wherein, step i) is preceded by inserting the first end through a first object and inserting the second end through a first portion of a second object, and step ii) is preceded by moving the first insertion region over a second portion of the second object.

3. The method of claim 2, wherein the second object is a chain or cordage, and the first portion is a first link and the second portion is a last link, an end-termination or the end of a cordage.

4. The method of claim 1, wherein the flexible connection member comprises a loop formed of a flexible material.

5. The method of claim 1, wherein the flexible connection member comprises a flexible elongated body having the first end and the second end, separated by the intermediate portion and comprising at each end the respective first insertion region and second insertion region.

6. The method of claim 5, wherein the flexible connection member is formed from a rope having first and second ends formed by braiding.

7. The method of claim 1, wherein the flexible connection member comprises a loop formed of an endless band or rope.

* * * * *